United States Patent
Waghmare et al.

(10) Patent No.: US 9,203,975 B2
(45) Date of Patent: Dec. 1, 2015

(54) SYSTEM AND METHOD FOR USER LIFECYCLE MANAGEMENT IN TRADITIONAL TELECOM/CABLE OPERATOR TECHNOLOGY ENVIRONMENTS

(75) Inventors: Gemini Waghmare, Toronto (CA); Jay Deen, Toronto (CA); Jingyu Wang, Markham (CA); Leor Rosenberg, Maple (CA); Lucia Rozborova, Toronto (CA)

(73) Assignee: UXP Systems Inc., Toronto (CA)

(*) Notice: Subject to any disclaimer, the term of this patent is extended or adjusted under 35 U.S.C. 154(b) by 54 days.

(21) Appl. No.: 13/568,620

(22) Filed: Aug. 7, 2012

(65) Prior Publication Data

US 2013/0101101 A1  Apr. 25, 2013

Related U.S. Application Data

(60) Provisional application No. 61/549,967, filed on Oct. 21, 2011.

(51) Int. Cl.
*H04M 15/00* (2006.01)

(52) U.S. Cl.
CPC ............ *H04M 15/70* (2013.01); *H04M 15/755* (2013.01); *H04M 15/765* (2013.01); *H04M 15/7652* (2013.01); *H04M 15/7655* (2013.01); *H04M 15/80* (2013.01)

(58) Field of Classification Search
USPC ........................................ 379/114.01–114.03
See application file for complete search history.

(56) References Cited

U.S. PATENT DOCUMENTS

| | | | | |
|---|---|---|---|---|
| 7,058,946 | B2* | 6/2006 | Acharya et al. | 718/102 |
| 8,214,890 | B2* | 7/2012 | Kirovski | H04L 9/3073 726/12 |
| 8,335,507 | B1* | 12/2012 | Mangal | 455/432.3 |
| 2004/0153560 | A1* | 8/2004 | Masuhiro et al. | 709/229 |
| 2009/0144237 | A1* | 6/2009 | Branam et al. | 707/3 |
| 2010/0268768 | A1* | 10/2010 | Kurtenbach | H04L 67/1097 709/203 |
| 2012/0008786 | A1* | 1/2012 | Cronk | H04L 63/102 380/282 |
| 2013/0007032 | A1* | 1/2013 | Klappert et al. | 707/759 |
| 2013/0073485 | A1* | 3/2013 | Sathish et al. | 706/12 |

FOREIGN PATENT DOCUMENTS

WO    WO 2007008922 A2 *  1/2007

* cited by examiner

*Primary Examiner* — Duc Nguyen
*Assistant Examiner* — Assad Mohammed
(74) *Attorney, Agent, or Firm* — Brett J. Slaney; Blake, Cassels & Graydon LLP

(57) ABSTRACT

A system and method are provided for enabling user lifecycle management for individual users of media and network services offered by a telecommunications, cable or media provider. The method comprises providing a first component to create and maintain individual users and associated profile information, and mapping subscriptions or entitlements to those users via interfacing to underlying information technology systems. The method also comprises components to associate network service information to these users, in order to enable authorized, personalized and seamless access to multiple network services across multiple devices. The method is also used to enable new, one-to-one relationships between telecommunications, cable, and media operators and the consumers of their services.

20 Claims, 8 Drawing Sheets

SYSTEM AND METHOD FOR USER LIFECYCLE MANAGEMENT IN TRADITIONAL TELECOM/CABLE OPERATOR TECHNOLOGY ENVIRONMENTS

This application claims priority from U.S. Provisional Patent Application No. 61/549,967 filed on Oct. 21, 2011, the entire contents of which are incorporated herein by reference.

TECHNICAL FIELD

The following relates to systems and methods for creating and managing individual user profiles and providing a framework for user lifecycle management and has particular utility when applied within a pre-existing telecommunications and cable operator environment. More particularly, these systems and methods may be used to enable seamless, multiservice personalization of communications and media services across multiple screens, while leveraging existing operator systems and infrastructure.

DESCRIPTION OF THE RELATED ART

Telecommunications and cable operators may offer many services to households and individuals for consumption. These services may include but are not limited to voice and video calling services, voice, text and multimedia messaging services, electronic program guides, live video, video-on-demand, digital video recording services, etc. Increasingly, operators are considering offering additional, third party services including but not limited to, home monitoring, social media, interactive advertising, electronic commerce and more.

Each of these services is typically enabled via an underlying network service system, physically residing in the telecommunications or cable operator environment, or available via a third party network service system. These network service system instances may enable one or more services, and associated service features. In order to deliver a full portfolio of services to an individual, many disparate network service systems are typically required by the operator. However, each of these network service systems may have its own technology protocols, design, architecture and capabilities. Examples of network service systems may include but are not limited to voice calling switches, voicemail servers, messaging and instant messaging servers, electronic program guide systems, video delivery systems and other systems.

In order for an individual user to access underlying services, they typically purchase a subscription to a service, after which, an instance of that service is provisioned for that user in the underlying network, such that an authorized device or user may access the service instance for the individual user's use.

The lifecycle of purchasing, activating and using network services is well defined in telecom and cable operator environments. Typically, a customer will create a financial billing account, inside of which one or more services may be subscribed. These services will then be provisioned to network service systems and/or a provisioned devices, where they may be consumed by one or more individual users, typically related to that financial billing account (e.g.: household members, corporate employees, etc).

When an individual user wishes to use a provisioned service, they use a provisioned device (e.g.: set-top-box, or cellular phone), connect a third party device to a provisioned network circuit (e.g.: fixed phone line), or manually access and authenticate to the provisioned network system server (e.g.: voicemail, e-mail) and use the service. The provisioned device or network service authenticates to the network and seamlessly authorizes the user to use that device. In this manner, anyone who has the appropriate access to a provisioned device, provisioned network circuit, or network service credentials, may use the service. In this way, a cable or telecom operator may provision several cellular phones, set-top-boxes, and network circuits within a given household or corporate account.

Even though the operator has its subscriptions billed to and paid for by one financial account owner of the account, the services are normally freely accessible by several members of the household, given that these members may have access to the specific devices and network circuits that have been provisioned for use by the operator systems.

SUMMARY

In one aspect, there is provided a method of enabling network services to be provided to individuals, the method comprising: interfacing with an existing telecommunications infrastructure providing the network services; mapping subscriptions handled by the existing telecommunications infrastructure to the individuals from existing billing and subscription management systems operated by the telecommunications infrastructure; and enabling at least one of the individuals to access at least one network service by referencing mapped subscriptions to determine a valid subscription available to the at least one individual.

In another aspect, there is provided a method enabling network services to be provided to individuals, the method comprising: receiving a request to create a new individual for accessing at least one network service; creating a new individual after successful validation of data provided in association with the request; determining that the new individual is not to have a subscription account for the at least one network service; and providing the at least one network service to the new individual without requiring the subscription.

In yet other aspects, there are provided computer readable media and systems and apparatus configured to perform the above methods.

BRIEF DESCRIPTION OF THE DRAWINGS

Embodiments will now be described by way of example only with reference to the appended drawings wherein.

DETAILED DESCRIPTION

Figure 1:
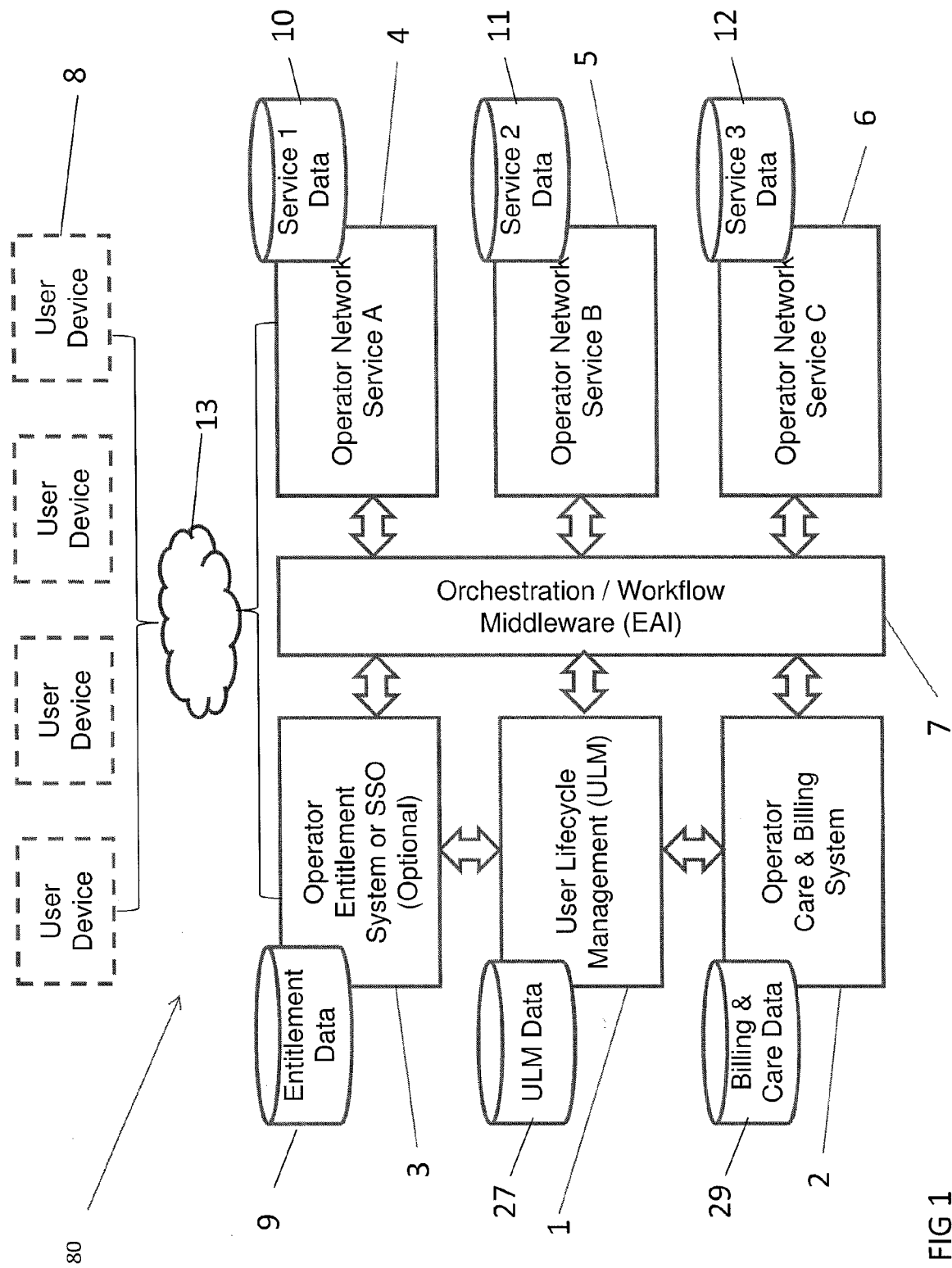
FIG. 1 is an example configuration for a computing platform comprising a user lifecycle management system in a typical telecom or cable operator environment.

It will be appreciated that for simplicity and clarity of illustration, where considered appropriate reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been recognized that while the existing model of account-based service subscription has traditionally served the needs of the telecommunications operator industry, the proliferation of new environments where individual users are increasingly able to authenticate to any device or network and access their specific set of personalized services, presents a challenge to operators using the existing model. In addition, it has been found that telecom and cable operators are increasingly interested in building one-to-one relationships between themselves and individual users, to enrich and personalize service experiences.

It has also been recognized that while the existing model of device, network or credential-based authentication to a service has also traditionally served the needs of the telecommunications operator industry, a more flexible method of authentication, namely one that allows a specific user to identify themselves independently of any association to a network circuit or device, would allow that user to access their specific set of subscribed services in a unified way, anywhere, on any device, at any time. Moreover, by enabling such personalized access, an enriched level of personalization of the service itself is possible, allowing the individual user to create and receive specific service profiles, recommendations and other content and session data.

It has been found that in telecom and cable environments, attempts have been made at extending the existing account data model to map subscriptions to individual users. The process of mapping subscriptions to individual users is commonly termed service federation. Service federation is a component of some existing identity management systems that seek to associate service attributes to individual users. However, it has also been found that these systems do not adequately handle the full user-lifecycle of users in the system, including the creation of users, the management of user preferences, and the inclusion of network service specific attributes and session data required to personalize the service experience. Since the telecom or cable operator has no notion of individual users, or of the specific individual consumers of network services, a comprehensive system is needed to create users, associate subscriptions of one or more services to individual users, bind service authentication credentials to these user profiles, assign hierarchical roles and permissions to these users, build and maintain service profiles of these users to further personalize network service experiences, and track service activities if desired, at a user-based level. By doing so, operators will be able to use these user entities to break two aforementioned paradigms:

A. The account-paradigm that limits the relationship between the telecom operator and the customer to a multi-service, multi-user account relationship, and inhibits one-to-one user-to-operator relationships.

B. The device-paradigm that limits authentication of services to an authorized device or network circuit, and therefore tethers services to specific devices and network circuits, as opposed to enabling services to be accessed securely on any device or network.

The following addresses challenges posed by existing telecom operator systems by deploying a user lifecycle management system which is adapted to extend existing operator capabilities via a new computing platform.

In one aspect there is a provided computing platform and framework that utilizes a user lifecycle management system (ULM). The ULM comprises a multi-dimensional user data repository and application logic and processes that work together to allow the creation and management of individuals, each of which have defined relationships with a telecom or cable operator.

The platform may be integrated to existing account-centric billing and business support systems to query and account and service subscriptions that reside within the billing systems, in order to map individual subscriptions to individual users.

The platform also allows the creation of users that respect the policies of the existing operator billing system. For example, a primary user may be defined in the computing platform that maps to the financial account owner of an existing billing account. Secondary users within the account may be designated as users of services but may not have the same administrative authority of the financial account owner, unless granted by the financial account owner.

The platform allows for the importing and mapping of pre-existing individual users that may already exist in the telecom or cable operator's system. For example, a user ID and user profile may already exist for a billing account owner in a pre-existing operator legacy system. The computing platform described herein allows for this data to be mastered by the pre-existing system, yet leveraged by the computing platform and referred to for the creation of individual sub-users via the computing platform.

The computing platform is designed to fully integrate and extend existing operator billing systems that model account data. Each account may have one or more service subscriptions, and may provide services to one or more individual users. The computing platform enables the creation of a many-to-many mapping of users to subscriptions, where the subscriptions federated to a user may come from multiple billing accounts.

In another aspect, the ULM provided by the computing platform complements the billing and business support system data stored for a user with the additional network service data for each individual user. For example, in addition to mapping one or more subscriptions to a user, the computing platform may model the specific network service preferences and profile information against the user's data model. This data may include but is not limited to preferences (e.g., service favorites, service recommendations, service restrictions), session data (e.g., video bookmarks, last message read, last login, etc), credential data (e.g., voicemail passwords, video on demand passwords) and other data.

By combining Billing and Business Support System data typically held by IT Systems in a telecom and cable operator environment and Network Service data typically held by Network Engineering Systems in an telecom and cable operator environment, a fully comprehensive, 360-degree user profile may be created and maintained for each user, to deliver a unified, seamless, personalized experience for users.

In another aspect the computing platform may also be used support a full end-to-end lifecycle for the creation and management of a user that has no association with an underlying billing account. For example, operators may wish to offer services to new user for which they require no account to be created. This may be the case for certain free services, or for services which have an alternate billing mechanism, like direct credit card billing.

The computing platform therefore becomes a management system for users of the operator's services, and enables the classification of a user as an account-owner, a non-owner, a non-owner with some administrative privileges, or a user with an alternative billing arrangement outside of the existing billing system. A flexible permissions and hierarchy management system enables configurable definition of the roles and permissions available to a user, based on the operator's business rules.

In another aspect, in addition to providing full user lifecycle management, user profile management, mapping of subscriptions, and hierarchy/permissions data, the user's service-specific attributes may be held by the ULM, in order to facilitate personalized, seamless access to underlying services. The user's service specific attributes include credential data (e.g., passwords, authentication information), service preferences (e.g., favorites, recommendations, etc.), and session data (e.g., activity logs, video bookmarks, last-session data, etc.).

Using the service-specific attributes, the operator may leverage the full service specific data of a user when they authenticate to a specific device, to reflect all of their service specific information in a user experience eon any screen.

In another aspect, the computing platform may employ a two-tiered architecture by which the user's profile is stored centrally in the computing platform, and locally on an end user's device. This enables an end user to access their user profile and services even when a specific device is not connected to the core computing platform.

The computing platform may also employ performance efficient digital signatures to maintain the synchronization of data between the two tiers, and between master data held by existing systems, Turning now to the figures, FIG. 1 illustrates an example of a computing framework 80 for providing user lifecycle management, enabling the creation and management of new user-level service profiles for media services. The computing platform 80 comprises a ULM 1 which is operable to interact with an operator's existing Customer Care and Billing System (CCB) 2. The CCB 2 holds account-level service subscriptions for media services in billing and care data 29, but the CCB 2 does not store every individual user, or consumer of media services. Rather, the ULM 1 system maps the one or more service subscriptions held in one or more accounts in CCB 2 against one or more individual users stored by the ULM 1 in the ULM data 27. This subscription-to-user mapping stored in the ULM data 27 enables the ULM 1 to allow the operators to break the two aforementioned paradigms. In this manner the various members of a household may be stored in ULM data 27 while only a single household account, with the various services the individuals users are using, is stored by the CCB 2 in the billing and care data 29, e.g., in the traditional manner.

There may also be an Operator Entitlement System or Single-Sign-On System (SSO) 3 that also holds some segment of user profiles in entitlement data 9, that may also be leveraged to supplement the ULM data 27 with complete user and service subscription and entitlement data 9. For example, many operator systems offer the account holder the ability to log in to their account to view bills, modify services and perform other account maintenance and service use functions. However, these systems typically offer one user access profile per account and do not allow sub-accounts for individual users within the account. The ULM 1 would allow the mapping of these pre-existing accounts that may be held by the Operator Entitlement System or SSO 3, or similar system, such that no duplication of existing functionality in the operator systems would be required.

Once the users stored by the ULM 1 have service subscriptions mapped against them, the user profile for those users may be further enhanced with service data related to the network services represented by these service subscriptions. The ULM user profile may have, for example, Service 1 Data 10 associated with Operator Network Service A 4 mapped against the user. Similarly, the ULM 1 user profiles may also include additional Service 2 Data 11 for Operator Network Service B 5, and Service Data 12 for Operator Network Service C 6, if relevant, in the example shown in FIG. 1. It can be appreciated that the number of operator network services and associated service data are for illustrative purposes only.

An Orchestration/Middleware Engine (EAI) 7 is also shown in FIG. 1, which may be used to retrieve, share, update and synchronize user data between the ULM 1, the CCB 2, and the Operator Network Services 4,5,6 and User Devices 8 connected to the platform 80 via a network 13.

Figure 2:
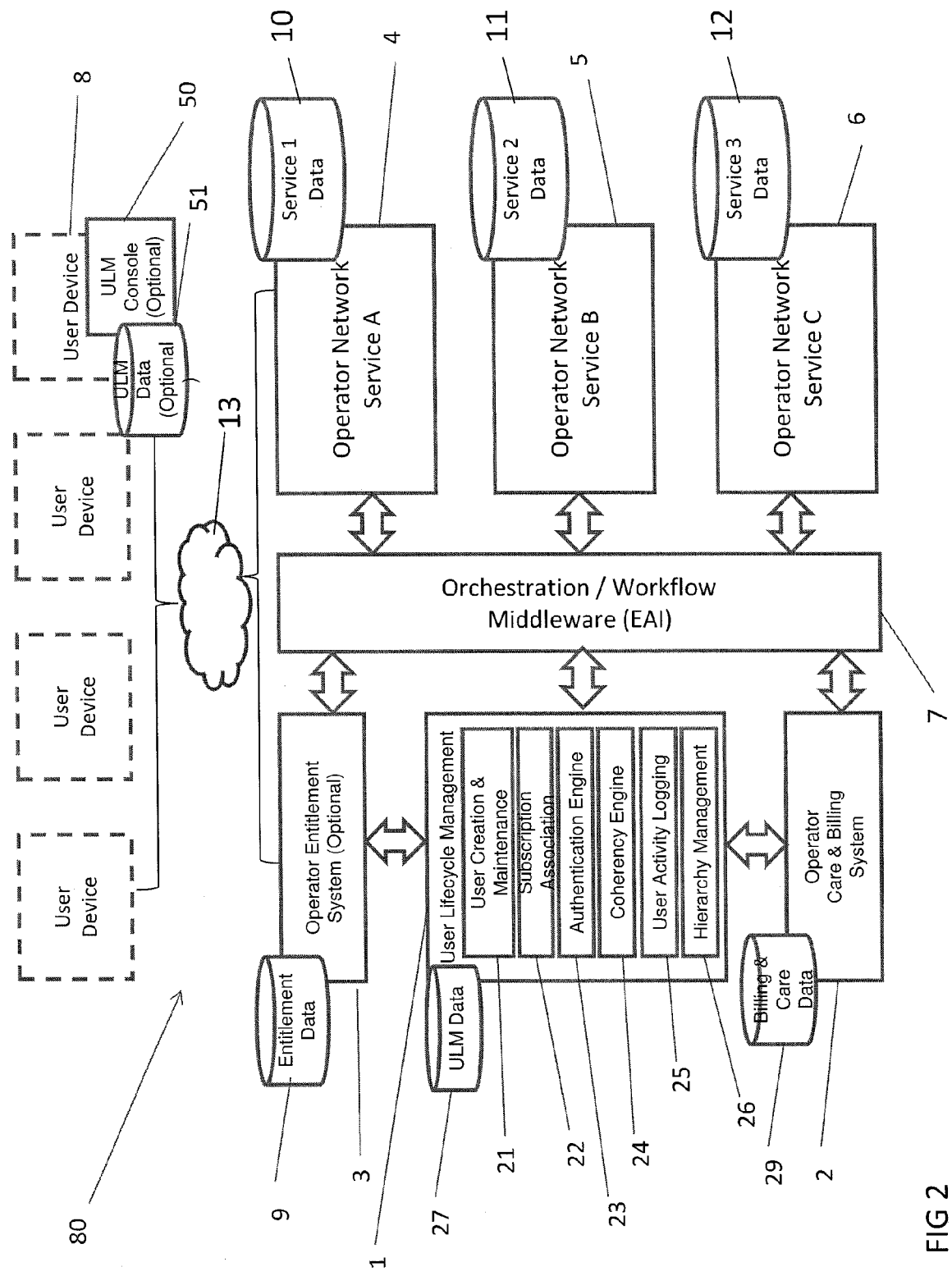
FIG. 2 is an example configuration for the computing platform of FIG. 1 illustrating an example configuration for the user lifecycle management system.

FIG. 2 Provides a detailed illustration of an example configuration for components that may be used to provided the ULM 1 of the computing platform 80. A User Creation and Maintenance component 21 is used to provide the business logic and processes for a user to be created and stored in the ULM Data 27. Standard functions of the User Creation and Maintenance component 21 include user creation, deletion, modification, user validation, error handling and user data maintenance. Following the creation of the user using the User Creation and Maintenance component 21, a Subscription Association component 22 may be used to provide a mechanism to query, validate and associate subscriptions from the Operator Care & Billing System 2 and map individual subscriptions resident in the Operator Care and Billing System 2 to users stored by ULM 1 in the ULM data 27.

An Authentication Engine 23 is shown, which may be used to provide support for a number of multiprotocol authentication and access interfaces, including but not limited to Lightweight Directory Access Protocol (LDAP), Security Assertions Markup Language (SAML), Open ID, OAuth, etc.; in order to provide seamless access to Operator Network Services A, B, C 4, 5, and 6. For example, if an end user stored by the ULM 1 has a subscription for a specific TV channel, the channel provider may require a SAML-based authentication to access that service. By implementing the support for the SAML authentication in the ULM Authentication Engine 23, the end user can benefit from one system providing the complete lifecycle of user creation, subscription association and service access. The Authentication Engine 23 may also use a proprietary authentication mechanism and credential to provide access to an underlying service. The proprietary credential and protocol information may be stored in the ULM Data 27 and the process to authenticate to underlying systems may be facilitated by Orchestration/Workflow EAI 7.

The ULM Data store 27 also provides for personalization of Network Services A-C 4, 5, and 6, via network service attributes held in ULM Data store 27 and by the services 4-6, to enrich and personalize the user's service experience. Examples of this data include service content favorites, recommendations, credentials, preferences, and other information.

An optional ULM Console 50 and data store 51 may be deployed on one or more end user devices 8 in order to encapsulate the ULM computing platform's components remotely on a user device 8. This may be done in order to enable an end user to log in to an operator application while the user is offline and still access a set of offline services and an offline user profile on the end user device 8. In order to ensure that any interaction with the online ULM 1 and database 27 is synchronized with the offline ULM Console 50 and ULM device data 51, a coherency engine 24 is resident in both the ULM 1 and the ULM console 50 to facilitate synchronization of data on all ULM Consoles 50 and the underlying core ULM 1. It should be noted that the ULM Console 50 and ULM device data 51 may include both a subset of components in the ULM 1 and a number of unique ULM Console-only functions in order to deliver user lifecycle management on a client device 8. For example, the ULM Console 50 may include device-side logic to send a message to the ULM 1 whenever a user is online on a specific ULM Console-enabled device 8.

A User Activity Logging Service 25 in the ULM 1, which may also be resident in the ULM Console 50, captures user activities related to Network Services 4-6 and associates these activities with the specified user and stores them against the user's profile in ULM Data store 27. The User Activity Logging Service 25 may then be used to personalize the service experience for the user across any number of devices 8 or screens. In one example, a user may begin watching a movie on a first User Device 8, leveraging an underlying video network service. If the user pauses that video, the User Activity Logging service 25 may then capture a video-bookmark indicating the time-stamp of the movie at the time it was paused, and store the video-bookmark in the ULM data 27. Subsequently, on any login of the user on any other user device 8, the ULM data 27, which includes details of the user activity logging actions, may be used to resume the video at the precise time at which it was previously paused by the individual user.

A Hierarchy Management component 26 may also be part of the ULM 1 in order to capture the different permissions and policies of the users within a specific billing account or other grouping. For example, a user who is also the financial payee of the account holding associated subscriptions may retain the 'top' position in the hierarchy, able to delete and add users, and assign services to those users. A user who is a spouse of the account holder may hold a subordinate, yet administrative role in this hierarchy, able to carry out delegated actions by the financial payee user. Other consumers of the services in the account may simply be assigned services to use, unable to carry out any administrative functions. Accordingly, the Hierarchy Management component 26 allows the network operator to implement user lifecycle management within existing system constraints and policies remaining in place.

Figure 3:
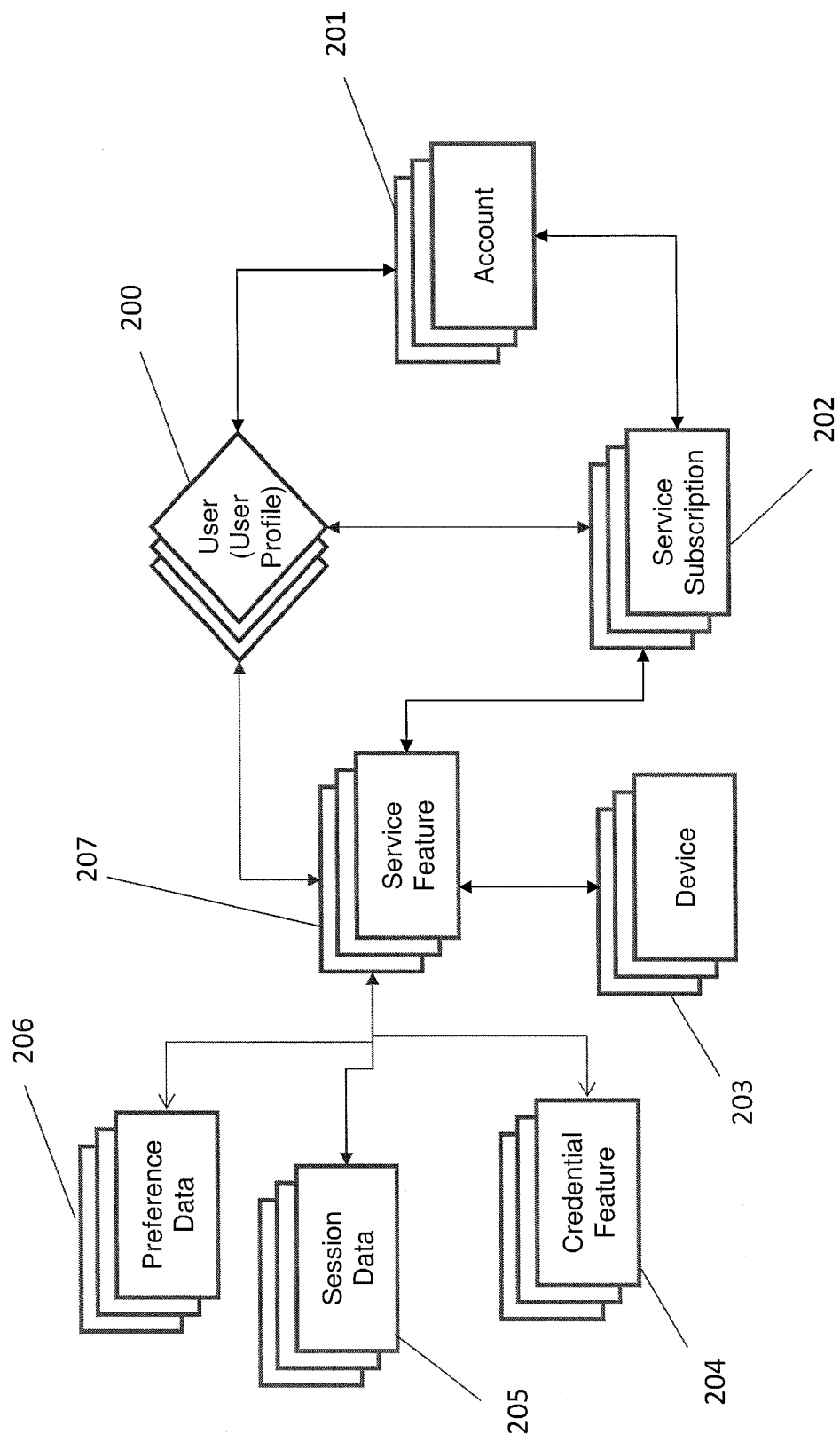
FIG. 3 is an example data model used by the computing platform.

FIG. 3 Illustrates a data model that may be utilized by the computing platform 80. The data model positions a user 200 (e.g., according to a user profile), as the central entity of the data model, against which service subscriptions 202 are mapped and personalized. The user profile leverages a third party orchestration engine 7 to access accounts 201 in which service subscriptions 202 are held. Having accessed one or more accounts 201 and specifying which specific service subscriptions 202 are held in those accounts 201, a user-to-service subscriptions mapping is created and held by the computing platform 80, e.g., in the ULM data 27. With this mapping complete, the service subscription 202 may inform the user profile 200 of specific service features 207 are resident in service subscription 202. This further refinement of the data model may also include device specific attributes 203 including features that may only be available on specific devices 8. Further personalizing the user data model are additional data sets, which may be uniquely mastered in the ULM computing platform 80, or replicated from other downstream databases, including but not limited to, session data 205, preference data 206 and credential data 205 as shown in FIG. 3.

Figure 4:
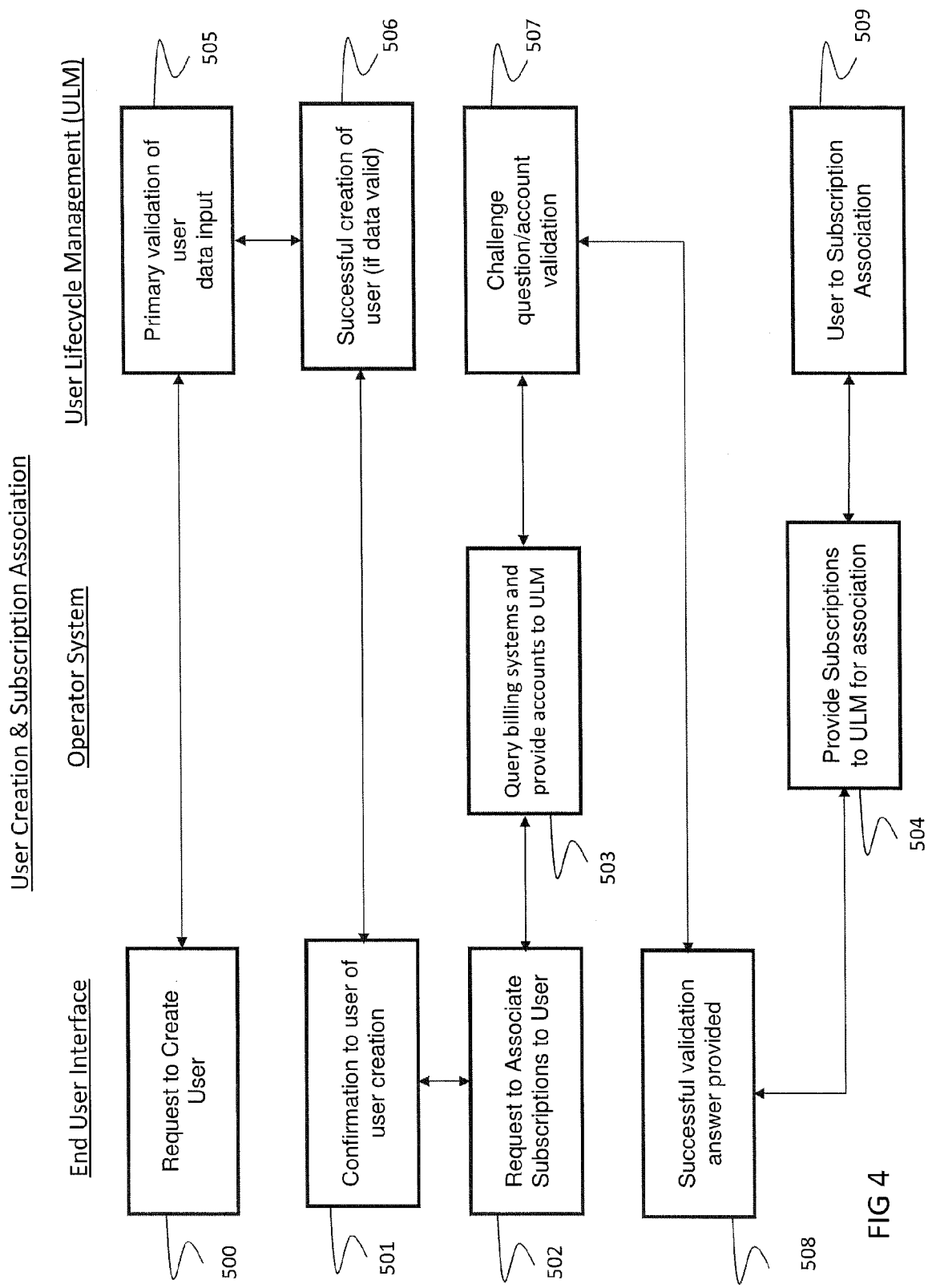
FIG. 4 is an example set of computer executable operations that may be performed in creating a user and associating subscription information to that user.

As shown by way of example in FIG. 4, the computing platform 80 may provide an end user the opportunity to create a user profile via an end user interface accessing the computing platform 80, e.g., via an API. A user may submit a request to create a user at 500, thereby triggering the API to present a request for user information which is validated successfully, in this example, by performing a primary validation of the user data input at 505. Following the successful creation of the user in the ULM 1 at 506, a confirmation is sent from the ULM 1 to the end user, which is received at 501 and presented to the user. The user may then submit a request to associate subscriptions to the user profile at 502. The operator billing or similar systems are queried at 503 against the account data provided at 502, and the ULM 1 provides a challenge question to perform an account validation at 507 and provide the rightful ownership or authorization to associate information within the account to the user. The user validates the association via a successful answer to the challenge question at 508, following which subscriptions are retrieved by the operator billing or similar system at 504, and those selected are mapped to the user successfully at 509.

It may be noted that following this association of subscriptions to users, a number of varying methods relying on integration between ULM 1 and Operator Care and Billing Systems 7 are available to maintain the synchronization of subscription to user mapping. The integration method chosen largely depends on the specific operator environment and architecture.

Figure 5:
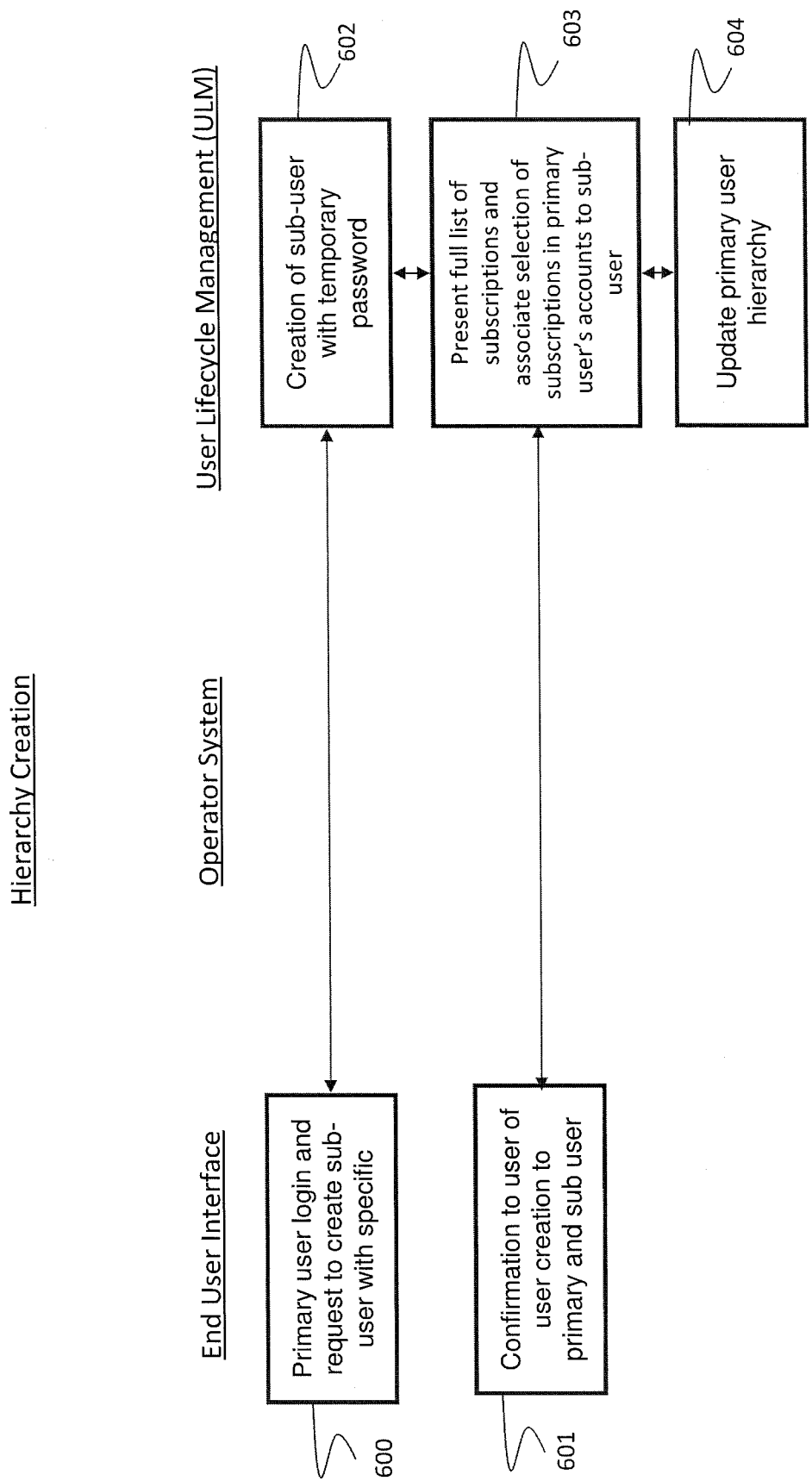
FIG. 5 is an example set of computer executable operations that may be performed in a user hierarchy management by the computing platform for a sample telecom or cable household account.

Once the user to subscription mapping is complete, the account owner who created the first user association in FIG. 4 may now begin to create additional users. As illustrated in FIG. 5, the primary user may be authenticated against their profile and services at 600 by logging in and requesting the creation of a sub-user. The ULM 1 proceeds to create the sub-user and temporary password within the account at 602, e.g., using an API at the ULM 1, which is communicated with using an operator provided End User Interface. Upon creation of any new users, the full list of subscriptions is presented at 603, where the primary user selects which service subscriptions are to be associated with the sub-user. Following the completion of this process, a confirmation and temporary access password are sent to the secondary, or sub-user, and are received at 601 and presented to the user by the End User Interface. The hierarchy of users for that account is then updated by the ULM 1 at 604. A primary user may follow this process to create additional users, as may a sub-user who has been assigned administrative or similar privileges by the primary user.

Figure 6:
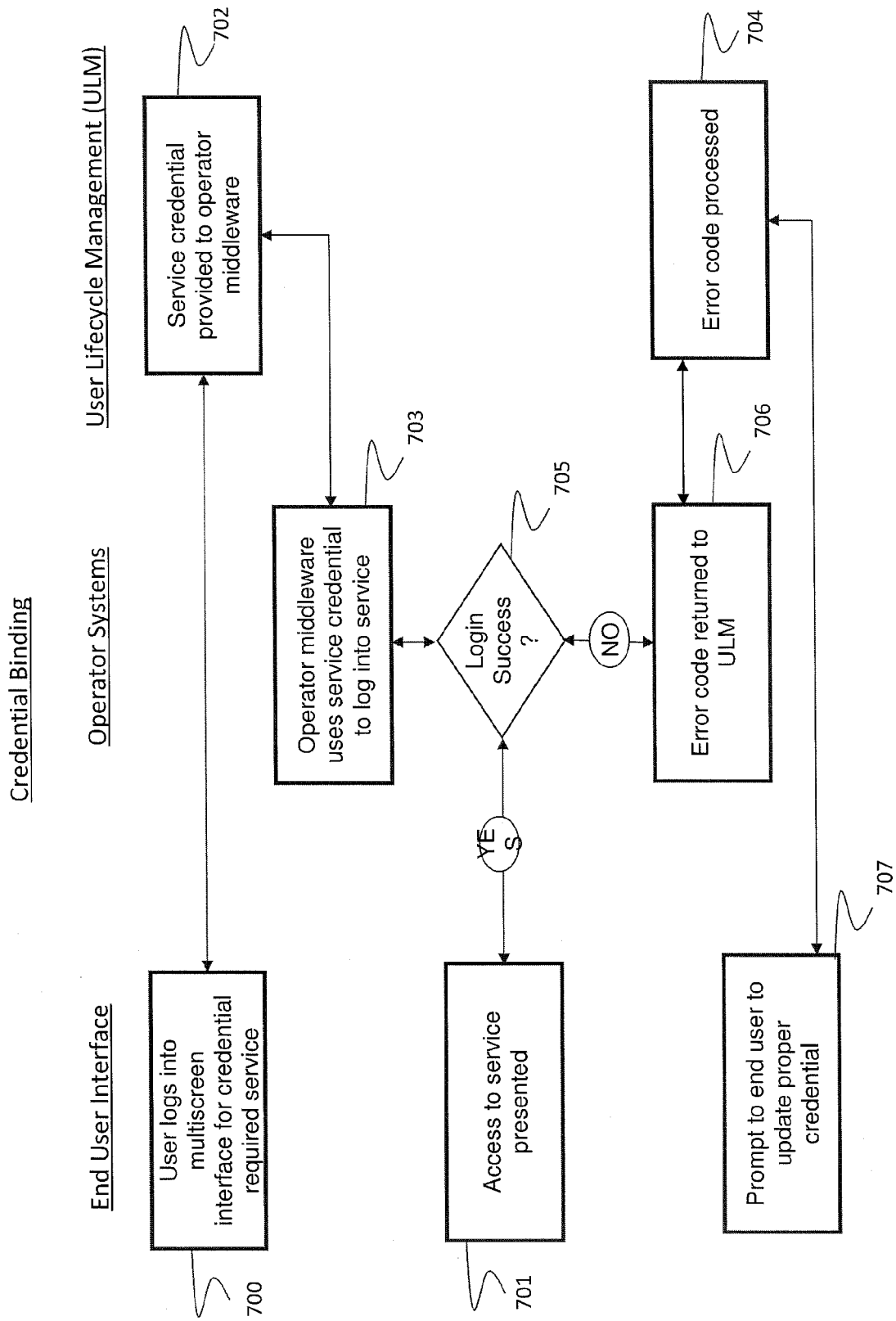
FIG. 6 is an example set of computer executable operations that may be performed in credential billing.

To illustrate the capability of the computing platform 80 to provide seamless access for an individual user to their underlying network services, FIG. 6 shows an end user who has a subscribed service associated to their user profile that requires a network credential to access the service (for example, voicemail or video-on-demand). Upon an initial login to the ULM 1 at 700 for credential-required service, a stored credential for the underlying network service indicated in the user's profile is passed to an operator middleware or other orchestration/workflow system EAI 7 by the ULM 1 at 702. The operator middleware uses the service credential to log into the service at 703 and the submitted credential is used by the network service at 705 to determine if the login is successful. If the login is successful, the user will seamlessly have access to that service at 701. If the credential does not match the credential stored by the underlying network service as determined at 705, an error code is returned by the network service at 706 and passed back to the ULM 1 for processing at 704. Because of this error, the user will be prompted via a ULM API to update the service credential at 707, such that the credential aligns with the one held by the network service and therefore permits authentication.

Figure 7:
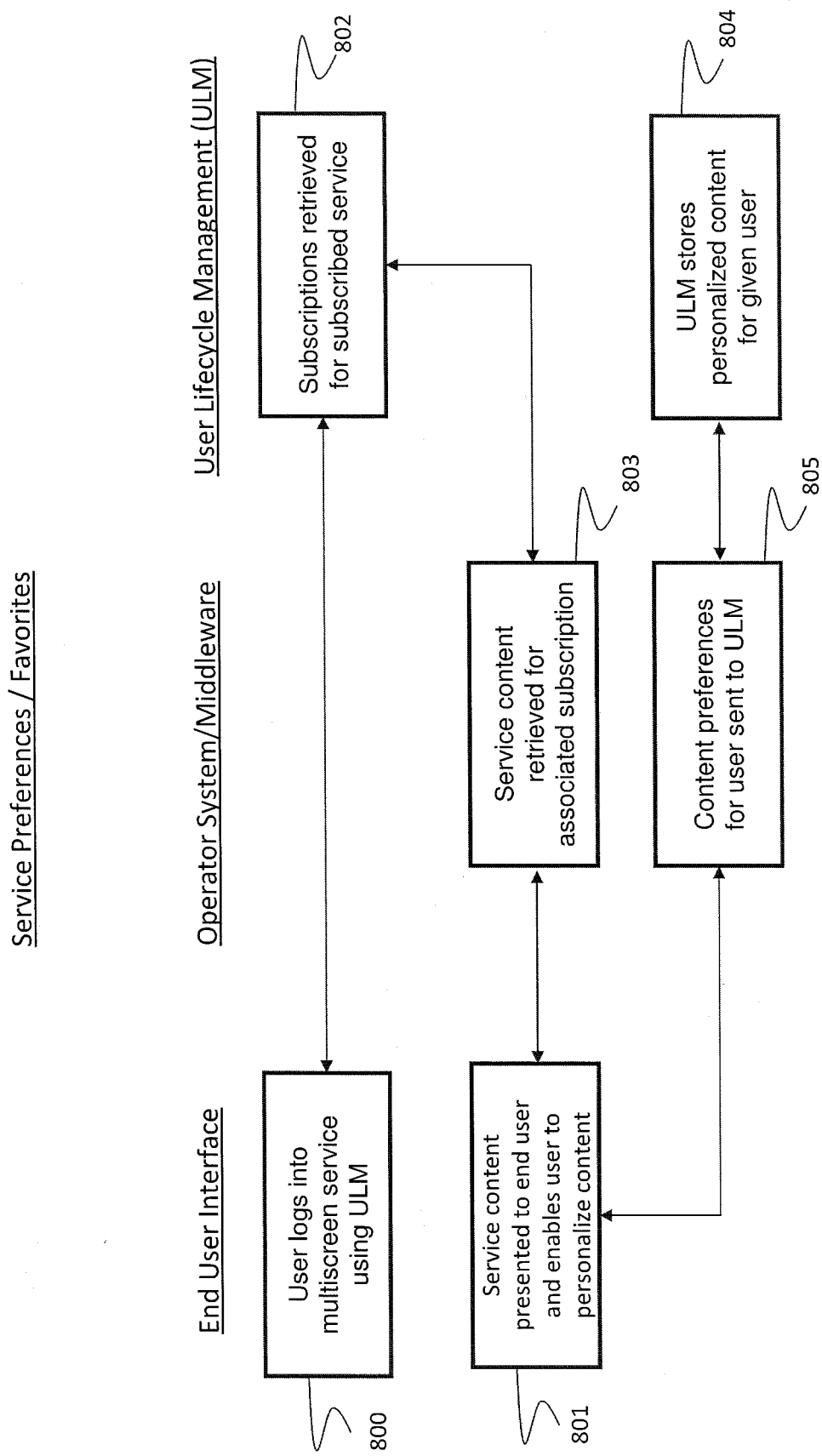
FIG. 7 is an example set of computer executable operations that may be performed in personalizing an account using preferences and favorites.

The User Lifecycle Management permitted by the computing platform 80, encompasses service personalization whereby the ULM 1 holds subscription information and service information. Another example of service personalization is provided in FIG. 7 wherein an end user uses the ULM 1 to further personalize an existing media service by storing service personalization data in ULM data 27. In this example a user may log into ULM 1 via an API at 800, and have subscriptions and underlying services accessed (e.g., as previously illustrated in FIG. 5) at 802. At 803, having authenticated to a media or network service (e.g., a TV, where a program guide may be displayed), the user may further personalize the service (e.g., by selecting those favorite shows they would like to see in their guide) at 801. While the network service may not have any knowledge of users, the ULM 1 has knowledge of the users and can personalize a service experience by overlaying filters or additional data above the media from a network service to deliver service personalization. Any personalization data sent at 805 via the middleware or similar platform will then be stored in ULM data 27 at 804.

It can be appreciated that the computing platform 80 and its components and the optional ULM Console 50 may be used as described in FIGS. 4 through 7 for any number of operator or third party services, such as voice calling, messaging video, social networking, e-commerce and more, permitting the operator to create personalized one-to-one relationships between itself and its users.

Figure 8:
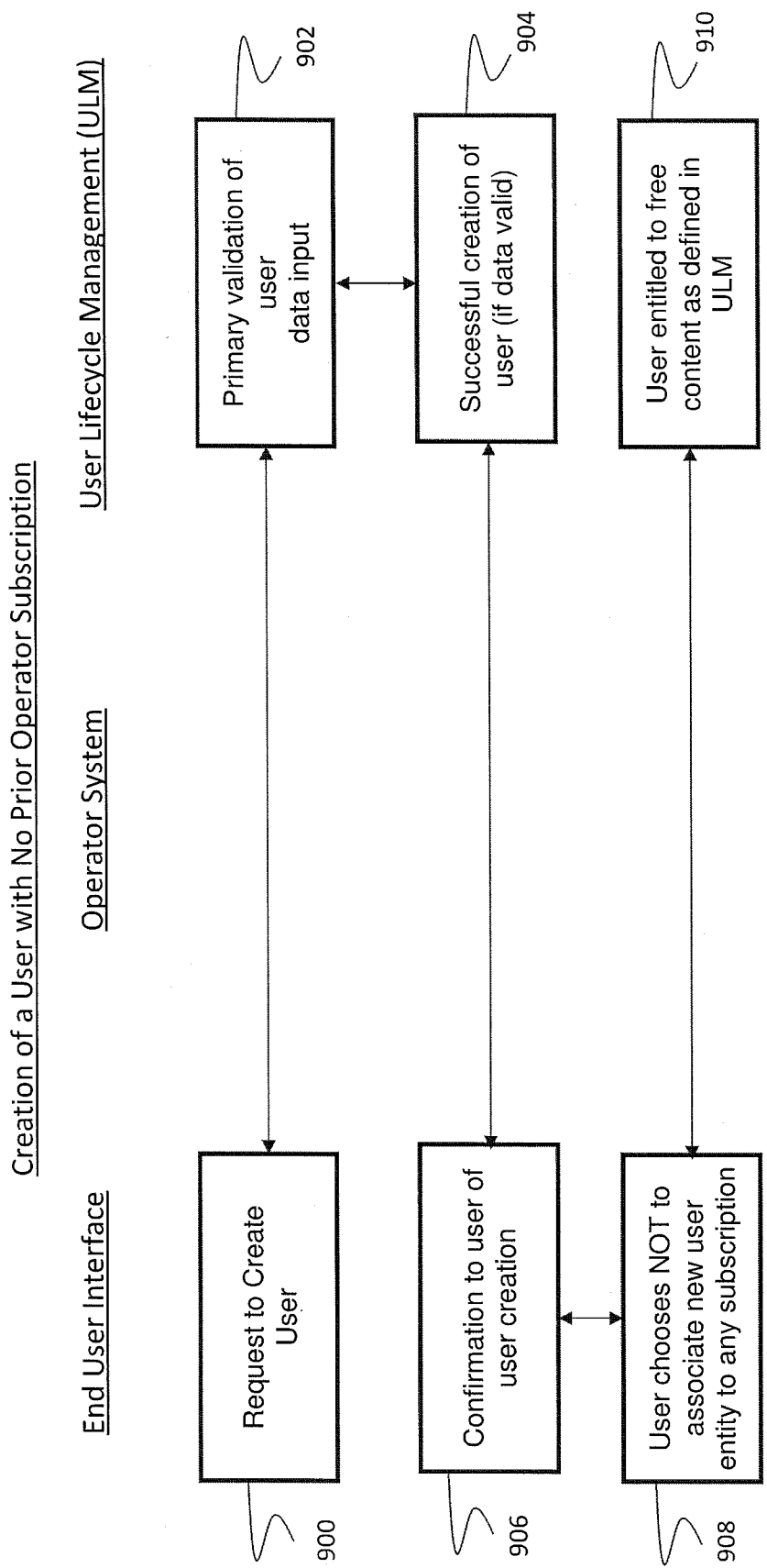
FIG. 8 is an example set of computer executable operations that may be performed in creating a user account for a user having no prior operator subscription.

Turning now to FIG. 8, the creation of a user account is shown, wherein the user has no prior operator subscription. At 900 an end user interface enables a user to make a request to create a new user and/or user account. The ULM 1 performs a primary validation of the user data input at 902. Successful creation of the user occurs at 904, assuming the input data is valid, and the user is provided with a confirmation at 906 that the new user and/or user account is created. At 908 the end user interface detects that the user has chosen to not associate the new user with any particular subscription, which enables the user to be entitled to, for example, free content as defined by the ULM 1 at 910. Accordingly, the computing platform 80 may also be used support a full end-to-end lifecycle for the creation and management of a user that has no association with an underlying billing account. For example, as discussed above, operators may wish to offer services to new user for which they require no account to be created. This may be the case for certain free services, or for services which have an alternate billing mechanism, like direct credit card billing.

The steps or operators in the flow charts and diagrams described herein are just for example. There may be many variations to these steps or operations without departing from the principles discussed above. For instance, the steps may be performed in a differing order, or steps may be added, deleted, or modified.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the computing platform 80 or accessible or connectable thereto. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

The invention claimed is:

1. A method of enabling network services to be provided to individuals, the method comprising:

providing an intermediary between at least one existing telecommunications network service and electronic devices configured to utilize the at least one existing telecommunications network service, the intermediary being a separate entity from the at least one existing telecommunications network service;

interfacing the intermediary with at least one existing telecommunications entitlement or billing system to control access to network services for account holders for the at least one existing telecommunications network service, the at least one network service being associated with one or more pre-existing billing accounts for the account holders;

creating at the intermediary, for account holders of the account subscriptions, groups of individual user identities permitted to utilize the corresponding network services under the same pre-existing billing account, wherein at least one account holder permits at least one additional user identity not being known as an account holder to the existing telecommunications entitlement or billing system, to utilize at least one network service associated with the corresponding pre-existing billing account;

storing, at the intermediary, credentials for the at least one account holder known to the existing telecommunications network service, to enable the intermediary to access the network services for both the account holder and the at least one additional user entity permitted to utilize the corresponding network services, without affecting the pre-existing billing accounts;

storing, at the intermediary, credentials for each of the at least one additional user identity, for authenticating the at least one additional user identity to access the corresponding network services associated with the account holder using the corresponding account holder credentials, without affecting the pre-existing billing accounts;

mapping, at the intermediary, the network services associated with the pre-existing billing accounts for the account holders to the permissions granted to individual user identities associated with the account holders to enable the intermediary to control access to the network services by the user identities on behalf of the at least one existing telecommunications network service according to the permissions, without affecting the pre-existing billing accounts;

receiving, at the intermediary, a request and credentials from one of the at least one additional user identity to access at least one network service using one of a plurality of electronic devices;

authenticating the request, at the intermediary, using the credentials of the at least one additional user identity and by referencing the mapping; and using, by the intermediary, the credentials of the corresponding account holder to enable the at least one additional user identity to access the requested network service on the one device regardless of which of the plurality of devices provides the request and without the at least one additional user identity having to be the account holder.

2. The method of claim 1, further comprising:
receiving a request to create a new user identity to be associated with one of the pre-existing billing accounts;
processing the request to create a new user identity by validating credentials associated with the pre-existing billing account;
enabling one or more of a plurality of network services to be associated with the new user identity according to the pre-existing billing account; and
storing the new user identity in the mapped subscriptions.

3. The method of claim 1, further comprising:
storing the credentials for the at least one account holder as part of a stored user profile.

4. The method of claim 1, further comprising:
storing a set of data related to one or more network services;
receiving a set of service preferences specific to an individual user; and
storing the set of service preferences as part of a user profile.

5. The method of claim 1, further comprising:
enabling the representation of a user hierarchy for a set of users and services to reflect varying degrees of administrative access and authority for a set of subscribed services;
receiving a set of hierarchy and role attributes specific to a group of users who may collectively be represented by an account with one or more subscribed services; and
storing the set of hierarchy data as part of a user profile.

6. The method of claim 1, further comprising providing a client-side console for storing and managing user profile data.

7. The method of claim 6, further comprising receiving data from the client-side console and synchronizing server-side data for an associated user profile.

8. The method of claim 7, wherein the data is received after a period of the client-side console being offline with respect to a server.

9. The method of claim 1, wherein enabling at least one of the additional user identities to access at least one network service further comprises providing a service credential to an operator system to enable network service to be provided to an end user interface upon successful login using the credential.

10. The method of claim 2, further comprising:
receiving data in association with the request to create a new user identity;
validating the data provided in association with the request without creating a new subscription account for the new user identity; and
providing the at least one network service to the new user identity on the plurality of devices subsequent to authenticating the new user identity.

11. A non-transitory computer readable medium storing computer executable instructions for enabling network services to be provided to individuals, the computer executable instructions comprising instructions for:
providing an intermediary between at least one existing telecommunications network service and electronic devices configured to utilize the at least one existing telecommunications network service, the intermediary being a separate entity from the at least one existing telecommunications network service;
interfacing the intermediary with at least one existing telecommunications entitlement or billing system to control access to network services for account holders for the at least one existing telecommunications network service, the at least one network service being associated with one or more pre-existing billing accounts for the account holders;
creating at the intermediary, for account holders of the account subscriptions, groups of individual user identities permitted to utilize the corresponding network services under the same pre-existing billing account, wherein at least one account holder permits at least one additional user identity not being known as an account holder to the existing telecommunications entitlement or billing system, to utilize at least one network service associated with the corresponding pre-existing billing account;
storing, at the intermediary, credentials for the at least one account holder known to the existing telecommunications network service, to enable the intermediary to access the network services for both the account holder and the at least one additional user entity permitted to utilize the corresponding network services, without affecting the pre-existing billing accounts;
storing, at the intermediary, credentials for each of the at least one additional user identity, for authenticating the at least one additional user identity to access the corresponding network services associated with the account holder using the corresponding account holder credentials, without affecting the pre-existing billing accounts;
mapping, at the intermediary, the network services associated with the pre-existing billing accounts for the account holders to the permissions granted to individual user identities associated with the account holders to enable the intermediary to control access to the network services by the user identities on behalf of the at least one existing telecommunications network service according to the permissions, without affecting the pre-existing billing accounts;
receiving, at the intermediary, a request and credentials from one of the at least one additional user identity to access at least one network service using one of a plurality of electronic devices;

authenticating the request, at the intermediary, using the credentials of the at least one additional user identity and by referencing the mapping; and using, by the intermediary, the credentials of the corresponding account holder to enable the at least one additional user identity to access the requested network service on the one device regardless of which of the plurality of devices provides the request and without the at least one additional user identity having to be the account holder.

12. A system comprising a processor and memory, the memory comprising computer executable instructions for enabling network services to be provided to individuals by operating the processor to:

provide an intermediary between at least one existing telecommunications network service and electronic devices configured to utilize the at least one existing telecommunications network service, the intermediary being a separate entity from the at least one existing telecommunications network service;

interface the intermediary with at least one existing telecommunications entitlement or billing system to control access to network services for account holders for the at least one existing telecommunications network service, the at least one network service being associated with one or more pre-existing billing accounts for the account holders;

create at the intermediary, for account holders of the account subscriptions, groups of individual user identities permitted to utilize the corresponding network services under the same pre-existing billing account, wherein at least one account holder permits at least one additional user identity not being known as an account holder to the existing telecommunications entitlement or billing system, to utilize at least one network service associated with the corresponding pre-existing billing account;

store, at the intermediary, credentials for the at least one account holder known to the existing telecommunications network service, to enable the intermediary to access the network services for both the account holder and the at least one additional user entity permitted to utilize the corresponding network services, without affecting the pre-existing billing accounts;

store, at the intermediary, credentials for each of the at least one additional user identity, for authenticating the at least one additional user identity to access the corresponding network services associated with the account holder using the corresponding account holder credentials, without affecting the pre-existing billing accounts;

map, at the intermediary, the network services associated with the pre-existing billing accounts for the account holders to the permissions granted to individual user identities associated with the account holders to enable the intermediary to control access to the network services by the user identities on behalf of the at least one existing telecommunications network service according to the permissions, without affecting the pre-existing billing accounts;

receive, at the intermediary, a request and credentials from one of the at least one additional user identity to access at least one network service using one of a plurality of electronic devices;

authenticate the request, at the intermediary, using the credentials of the at least one additional user identity and by referencing the mapping; and use, by the intermediary, the credentials of the corresponding account holder to enable the at least one additional user identity to access the requested network service on the one device regardless of which of the plurality of devices provides the request and without the at least one additional user identity having to be the account holder.

13. The system of claim 12, further operable to:

receive a request to create a new user identity to be associated with one of the pre-existing billing accounts;

process the request to create a new user identity by validating credentials associated with the pre-existing billing account;

enable one or more of a plurality of network services to be associated with the new user identity according to the pre-existing billing account; and store the new user identity in the mapped subscriptions.

14. The system of claim 12, further operable to:

store the credentials for the at least one account holder as part of a stored user profile.

15. The system of claim 12, further operable to:

store a set of data related to one or more network services;

receive a set of service preferences specific to an individual user; and store the set of service preferences as part of a user profile.

16. The system of claim 12, further operable to:

enable the representation of a user hierarchy for a set of users and services to reflect varying degrees of administrative access and authority for a set of subscribed services;

receive a set of hierarchy and role attributes specific to a group of users who may collectively be represented by an account with one or more subscribed services; and store the set of hierarchy data as part of a user profile.

17. The system of claim 12, further operable to provide a client-side console for storing and managing user profile data.

18. The system of claim 17, further operable to receive data from the client-side console and synchronizing server-side data for an associated user profile.

19. The system of claim 18, wherein the data is received after a period of the client-side console being offline with respect to a server.

20. The system of claim 12, wherein enabling at least one of the additional user identities to access at least one network service further comprises providing a service credential to an operator system to enable network service to be provided to an end user interface upon successful login using the credential.

* * * * *